(12) United States Patent
Totsuka et al.

(10) Patent No.: US 11,198,406 B2
(45) Date of Patent: Dec. 14, 2021

(54) GRILLE SHUTTER

(71) Applicants: Toyota Jidosha Kabushiki Kaisha, Toyota (JP); Aisin Seiki Kabushiki Kaisha, Kariya (JP)

(72) Inventors: Shun Totsuka, Miyoshi (JP); Kazuki Tsuboi, Kariya (JP); Ken Komatsubara, Nagoya (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 137 days.

(21) Appl. No.: 16/600,958

(22) Filed: Oct. 14, 2019

(65) Prior Publication Data

US 2020/0148147 A1    May 14, 2020

(30) Foreign Application Priority Data

Nov. 8, 2018    (JP) .............................. JP2018-210133

(51) Int. Cl.
  *B60R 19/52*    (2006.01)
  *B60K 11/08*    (2006.01)
  *B60R 19/18*    (2006.01)

(52) U.S. Cl.
  CPC .............. *B60R 19/52* (2013.01); *B60K 11/08* (2013.01); *B60R 19/18* (2013.01); *B60R 2019/1806* (2013.01)

(58) Field of Classification Search
  CPC . B60R 19/52; B60R 19/18; B60R 2019/1806; B60K 11/08
  See application file for complete search history.

(56) References Cited

U.S. PATENT DOCUMENTS 8,821,224 B2 *   9/2014   Alexander ................. B60J 9/04
                                                                454/70

FOREIGN PATENT DOCUMENTS

JP        2007-001503 A      1/2007

* cited by examiner

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A fragile portion is provided at a portion of a vertical frame bar. When an impact load from under a vehicle is applied to a grille shutter, the impact can be at least partially absorbed as the fragile portion undergoes plastic deformation (including damage). Thus, the impact exerted on a portion of the vertical frame bar other than the fragile portion is mitigated, and a fin can be restrained from coming off a frame. Moreover, the fin can be restrained from coming off the frame by a compact structure, because simply providing the fragile portion at a portion of the vertical frame bar can achieve that.

8 Claims, 5 Drawing Sheets

000
GRILLE SHUTTER

CROSS-REFERENCE TO RELATED APPLICATIONS

This application claims priority to Japanese Patent Application No. 2018-210133 filed on Nov. 8, 2018, which is incorporated herein by reference in its entirety.

BACKGROUND

1. Technical Field

The present disclosure relates to a grille shutter of a vehicle.

2. Description of Related Art

Japanese Patent Application Publication No. 2007-1503 discloses a technology involving providing bellows-shaped flexible connection parts between a front bumper and a grille shutter that includes a frame and a fin. During a vehicle collision, these flexible connection parts absorb deformation of the front bumper so as to reduce damage to the grille shutter.

However, the grille shutter disclosed in the above publication has the following problems: (i) The bellows-shaped flexible connection parts are provided so as to extend in a vehicle front-rear direction based on the assumption of a frontal collision of a vehicle. Therefore, in the case of an impact load from under the vehicle that can be encountered in situations such as driving on a rough road, the flexible connection parts may fail to sufficiently absorb the impact. As a result, the impact load from under the vehicle may damage the grille shutter, causing the fin to come off the frame on which the fin is supported. (ii) Having the shape of a bellows, the flexible connection parts make the structure for absorbing impact relatively large.

SUMMARY

The present disclosure provides a grille shutter that can, by a compact structure, restrain a fin from coming off a frame when an impact load from under the vehicle is applied to the grille shutter.

A grille shutter of an aspect of the present disclosure includes a frame and a fin. The frame includes a vertical frame bar extending in a vehicle height direction. Here, a fragile portion is provided at a portion of the vertical frame bar. The fin is movably supported on the vertical frame bar.

The grille shutter of the above aspect can produce the following effect. Since the fragile portion is provided at a portion of the vertical frame bar, when an impact load from under the vehicle is applied to the grille shutter in a situation such as driving on a rough road, the impact can be at least partially absorbed as the fragile portion undergoes plastic deformation (including damage). Thus, the impact exerted on a portion of the vertical frame bar other than the fragile portion is mitigated, and damage to the other portion of the vertical frame bar can be reduced. Therefore, supporting the fin on the portion of the vertical frame bar other than the fragile portion can restrain the fin from coming off the frame. Moreover, the fin can be restrained from coming off the frame by a compact structure, because simply providing the fragile portion at a portion of the vertical frame bar can achieve that.

In the grille shutter of the above aspect, the fin may include a shaft. The vertical frame bar may include a frame bar main body that has a recess and a frame bar cover that is provided separately from the frame bar main body and mounted to the frame bar main body. The fin may be movably supported on the vertical frame bar as the frame bar cover is mounted to the frame bar main body with the shaft inserted in the recess of the frame bar main body. The fragile portion may be provided in the frame bar cover.

The grille shutter of this aspect can produce the following effect. Since the vertical frame bar includes the frame bar main body and the frame bar cover and the fragile portion is provided in the frame bar cover, only the frame bar cover has to be replaced when the impact load applied to the grille shutter from under the vehicle is relatively small and only the frame bar cover has undergone plastic deformation without the frame bar main body undergoing plastic deformation. Thus, the number of parts needing to be replaced can be reduced.

In the grille shutter of the above aspect, the fin may include at least one upper fin and at least one lower fin. The frame bar cover may include an upper cover part that extends upward in a vehicle height direction from the fragile portion and covers a shaft of the upper fin, and a lower cover part that extends from the fragile portion and covers a shaft of the lower fin. The upper cover part and the lower cover part may be connected to each other by the fragile portion. Here, the fragile portion may be provided integrally with the upper cover part, or the fragile portion may be provided integrally with the lower cover part.

The grille shutter of this aspect can produce the following effect. Since the frame bar cover includes the upper cover part that covers the shaft of the upper fin and the lower cover part that covers the shaft of the lower fin, and the upper cover part and the lower cover part are connected to each other by the fragile portion, both the upper fin and the lower fin can be covered by a single frame bar cover, which is advantageous in reducing the number of parts.

In the grille shutter of the above aspect, the frame bar cover may include both the upper cover part and the lower cover part mounted on the frame bar main body.

The grille shutter of this aspect can produce the following effect. Since the frame bar cover includes both the upper cover part and the lower cover part mounted on the frame bar main body, both the upper cover part and the lower cover part can be maintained in a state of being mounted on the frame bar main body even when the fragile portion has undergone plastic deformation. Thus, it is possible to restrain the frame bar cover from coming off the frame bar main body, and the fin from coming off the frame, even when the fragile portion has undergone plastic deformation.

In the grille shutter of the above aspect, a thickness of the fragile portion may be smaller than a thickness of the lower cover part.

The grille shutter of this aspect can produce the following effect. Since the fragile portion is a portion having a smaller thickness than the upper cover part and the lower cover part, the fragile portion can be provided by a simple configuration.

In the grille shutter of the above aspect, a lower end of the upper cover part and an upper end of the lower cover part may be located at different positions in a vehicle front-rear direction.

The grille shutter of this aspect can produce the following effect. Since the lower end of the upper cover part and the upper end of the lower cover part are located at different positions in the vehicle front-rear direction, the upper cover part and the lower cover part can be restrained from butting against each other in the vehicle height direction, and thereby hindering the plastic deformation of the fragile portion, when an impact load from under the vehicle is applied to the grille shutter and the fragile portion undergoes plastic deformation.

In the grille shutter of the above aspect, the frame bar cover may be mounted to the frame bar main body ahead of the frame bar main body in a vehicle front-rear direction. An upper end of the lower cover part may be located on the vehicle front side of a lower end of the upper cover part in the vehicle front-rear direction.

The grille shutter of this aspect can produce the following effect. Since the upper end of the lower cover part is located ahead of the lower end of the upper cover part in the vehicle front-rear direction, the lower cover part rises to the vehicle front side of the upper cover part when the fragile portion undergoes plastic deformation and the lower cover part moves upward in the vehicle height direction. Thus, the upper cover part can be kept from moving ahead in the vehicle front-rear direction by the lower cover part. It is therefore possible to effectively restrain the upper cover part from coming off the frame bar main body and the upper fin from coming off the frame.

In the grille shutter of the above aspect, the fragile portion may be provided so as to extend in a vehicle front-rear direction.

The grille shutter of this aspect can produce the following effect. Since the fragile portion is provided so as to extend in the vehicle front-rear direction, the upper cover part and the lower cover part can be connected to each other by the fragile portion even when the lower end of the upper cover part and the upper end of the lower cover part are located at different positions in the vehicle front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
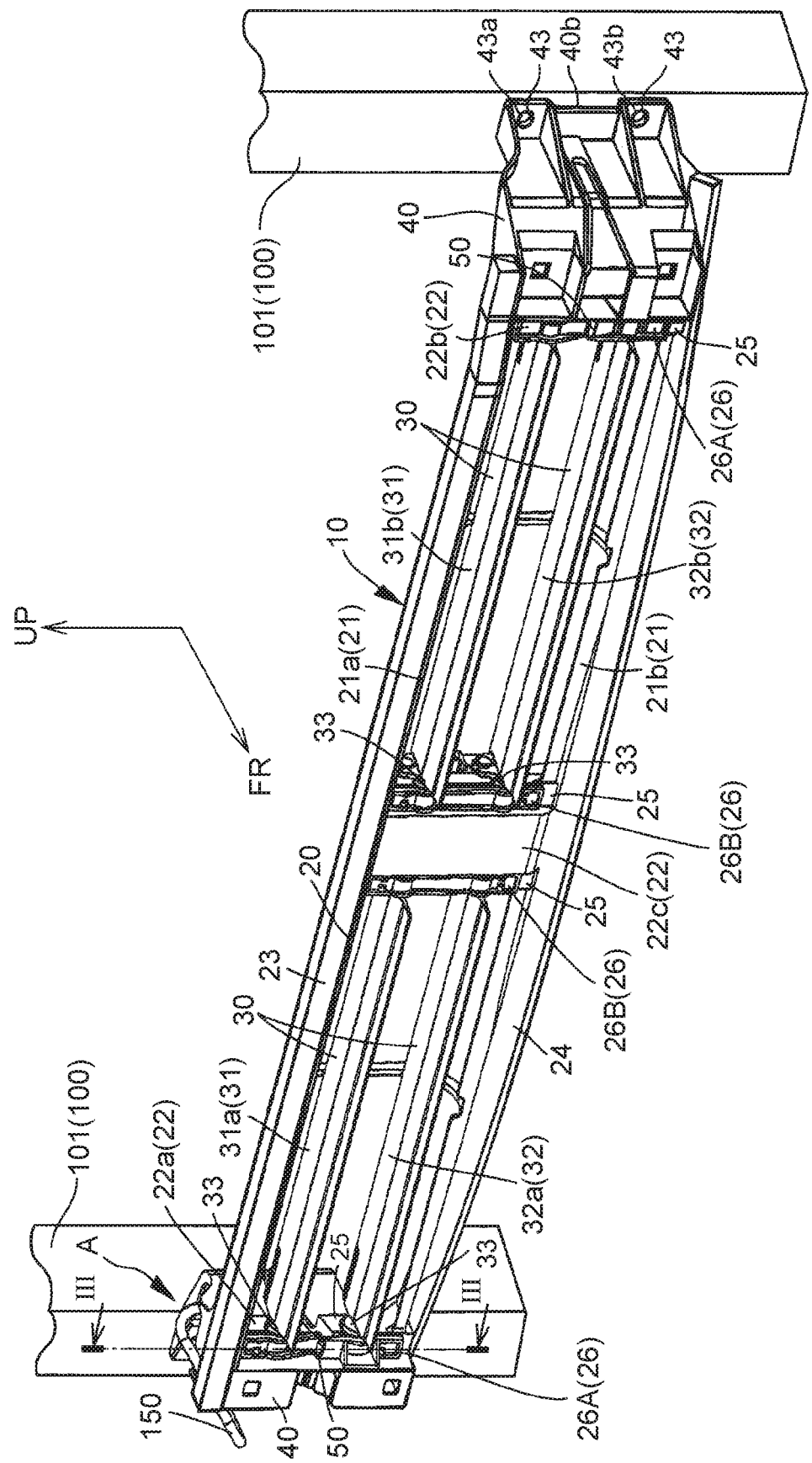
FIG. 1 is a perspective view of a grille shutter of an embodiment of the present disclosure.
Figure 2:
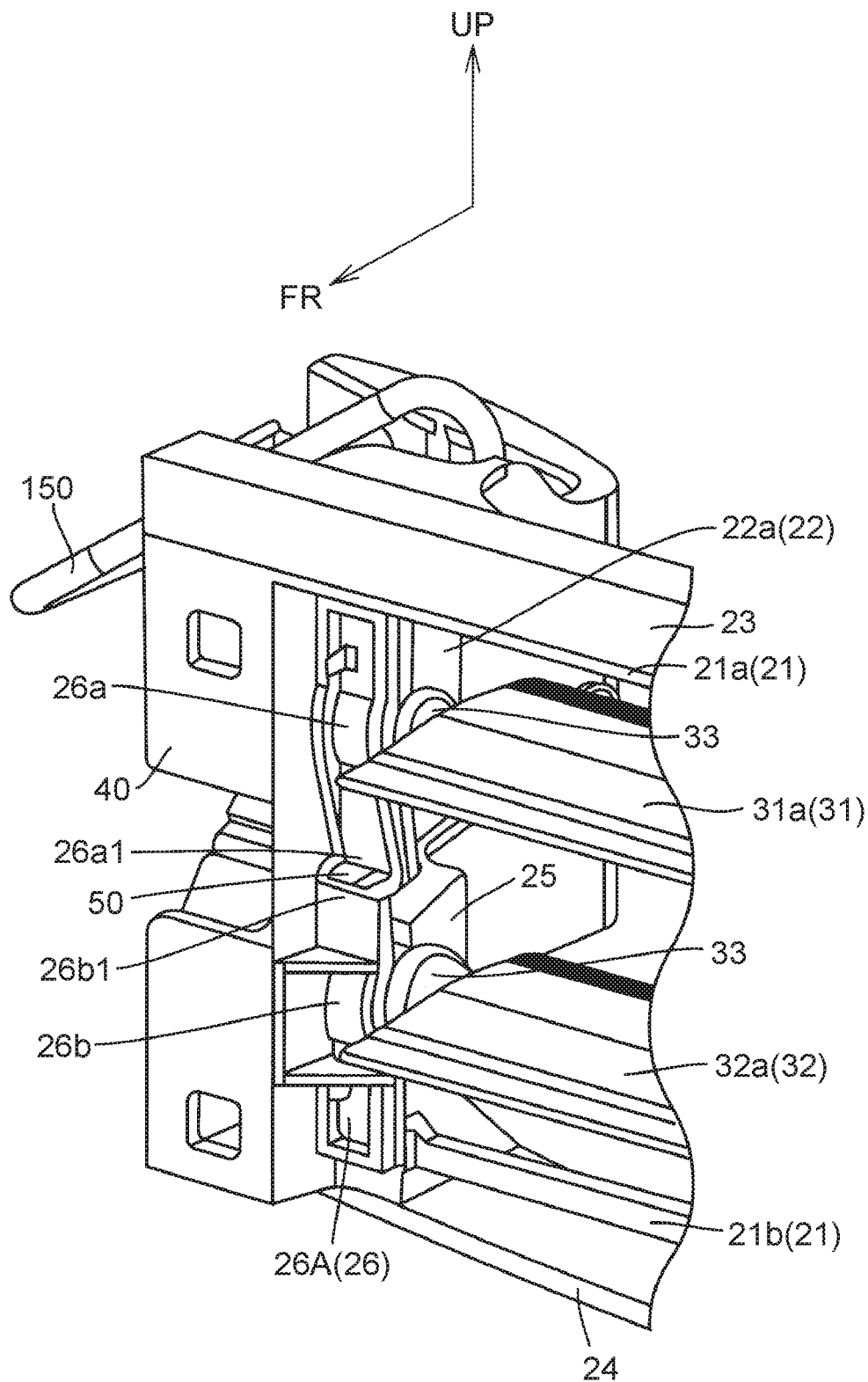
FIG. 2 is an enlarged view of part A of FIG. 1.

A grille shutter of an embodiment of the present disclosure will be described below with reference to the drawings. Reference signs FR and UP in the drawings indicate a front side in a vehicle front-rear direction and an upper side in a vehicle height direction, respectively.

Figure 5:
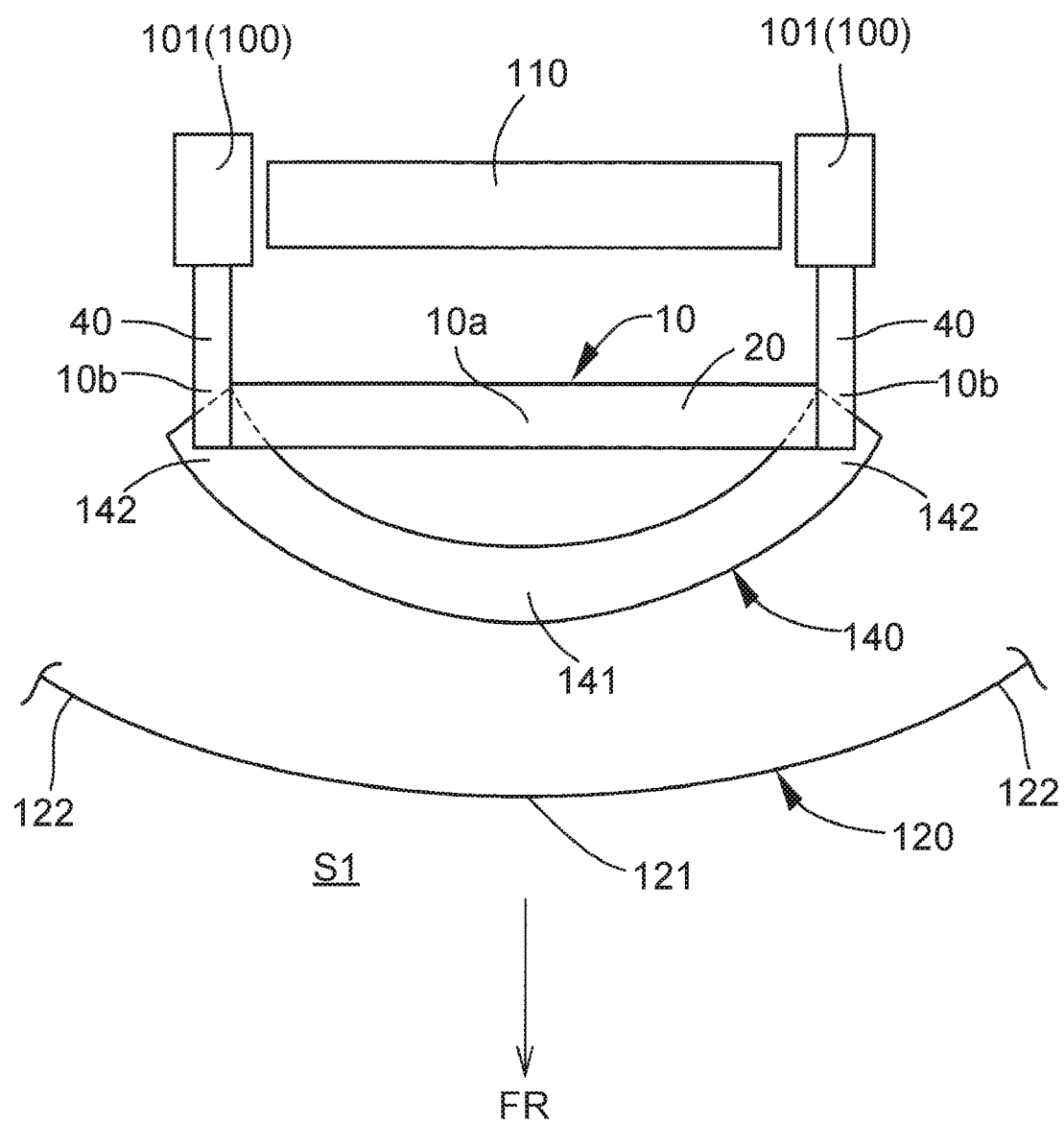
FIG. 5 is a schematic plan view showing a positional relation between the grille shutter of the embodiment of the present disclosure and a second cross member.

FIG. 5 shows a grille shutter 10 of the embodiment of the present disclosure and surroundings of the grille shutter 10. A radiator 110 that cools an engine coolant is disposed rearward in the vehicle front-rear direction of the grille shutter 10. The radiator 110 is supported on a metal vehicle body 100. The vehicle body 100 includes a pair of radiator support side members 101 that extend in the vehicle height direction, respectively on outer sides of the radiator 110 in a vehicle width direction.

A front grille 120 extending in the vehicle width direction is disposed ahead in the vehicle front-rear direction of the grille shutter 10. For example, the front grille 120 is made of resin. A central part 121 of the front grille 120 in the vehicle width direction is located ahead in the vehicle front-rear direction relative to both ends 122 thereof in the vehicle width direction, and thus the front grille 120 has a substantially circular arc shape with the central part 121 protruding ahead in the vehicle front-rear direction as seen in a plan view. The front grille 120 is provided with a grille opening (not shown) through which air in an outer space SI in front of the vehicle can pass. Air having passed through the grille opening flows through the grille shutter 10 toward the radiator 110.

A bumper reinforcement (not shown) extending in the vehicle width direction is disposed upward in the vehicle height direction of the grille shutter 10. A second cross member (which may also be called a lower bumper reinforcement) 140 extending in the vehicle width direction is disposed downward in the vehicle height direction of the grille shutter 10. The second cross member 140 is made of metal. A central part 141 of the second cross member 140 in the vehicle width direction is located ahead in the vehicle front-rear direction relative to both ends 142 thereof in the vehicle width direction, and thus, like the front grille 120, the second cross member 140 has a substantially circular arc shape with the central part 141 protruding ahead in the vehicle front-rear direction as seen in a plan view.

The grille shutter 10 can control the amount of air flowing through the grille opening of the front grille 120 toward the radiator 110. The grille shutter 10 is provided so as to extend straight or substantially straight in the vehicle width direction. As shown in FIG. 1, the grille shutter 10 includes a frame 20, a fin 30 supported on the frame 20, and brackets 40.

For example, the frame 20 is made of resin. The frame 20 has a shape of a frame with a long side extending in the vehicle width direction as seen from the vehicle front side. The frame 20 includes horizontal frame bars 21 including an upper frame bar 21a and a lower frame bar 21b, and vertical frame bars 22 including a right frame bar 22a, a left frame bar 22b, and a central frame bar 22c.

The upper frame bar 21a is provided at an upper end of the frame 20 so as to extend in the vehicle width direction. A sponge 23 as a sealing material is provided between the upper frame bar 21a and the bumper reinforcement (not shown) located above the upper frame bar 21a. The lower frame bar 21b is provided below the upper frame bar 21a so as to extend in the vehicle width direction. A sponge 24 as a sealing material is provided between the lower frame bar 21b and the second cross member 140 located below the lower frame bar 21b. The right frame bar 22a is provided so as to extend in the vehicle height direction and connect the upper frame bar 21a and the lower frame bar 21b to each other at ends on a vehicle right side. The left frame bar 22b is provided so as to extend in the vehicle height direction and connect the upper frame bar 21a and the lower frame bar 21b to each other at ends on a vehicle left side. The central frame bar 22c is provided so as to extend in the vehicle height direction and connect the upper frame bar 21a and the lower frame bar 21b to each other at central portions in the vehicle width direction.

Figure 3A:
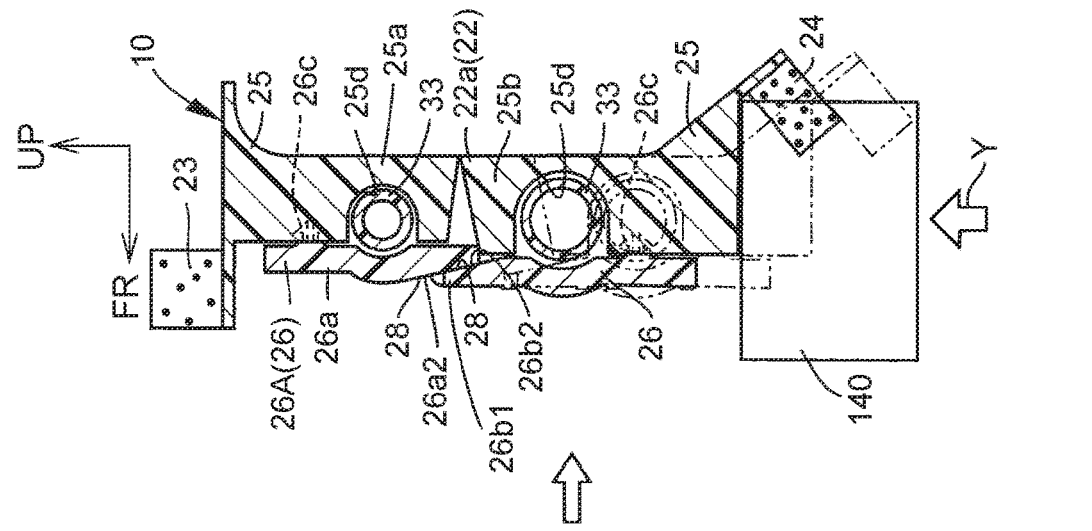
FIG. 3A is an enlarged sectional view taken along line III-III of FIG. 1, showing a state where no impact load is applied to the grille shutter.
Figure 3B:
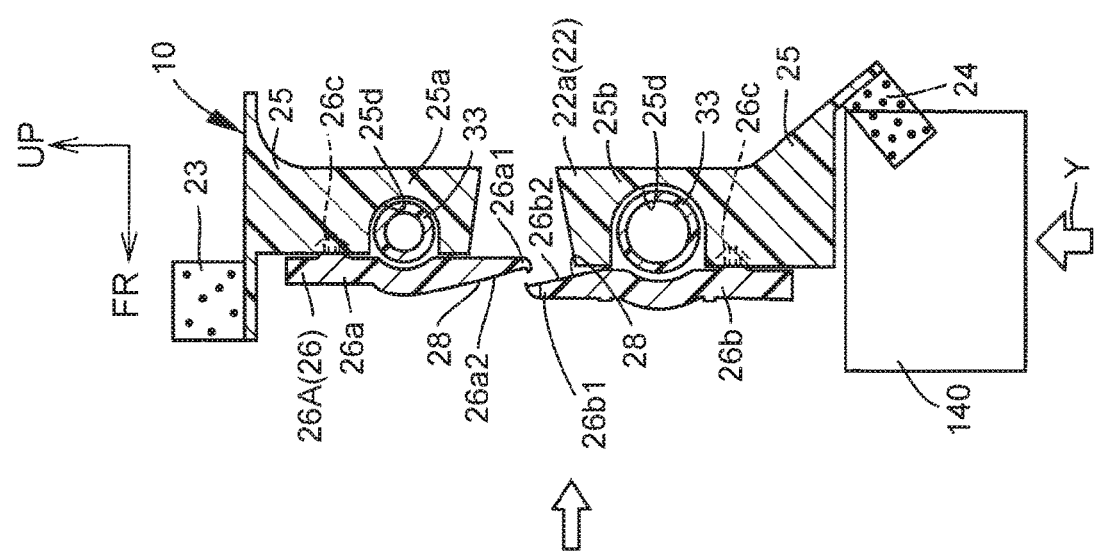
FIG. 3B is an enlarged sectional view taken along line III-III of FIG. 1, showing a state where an impact load has been applied to the grille shutter and a fragile portion has undergone plastic deformation.
Figure 3C:
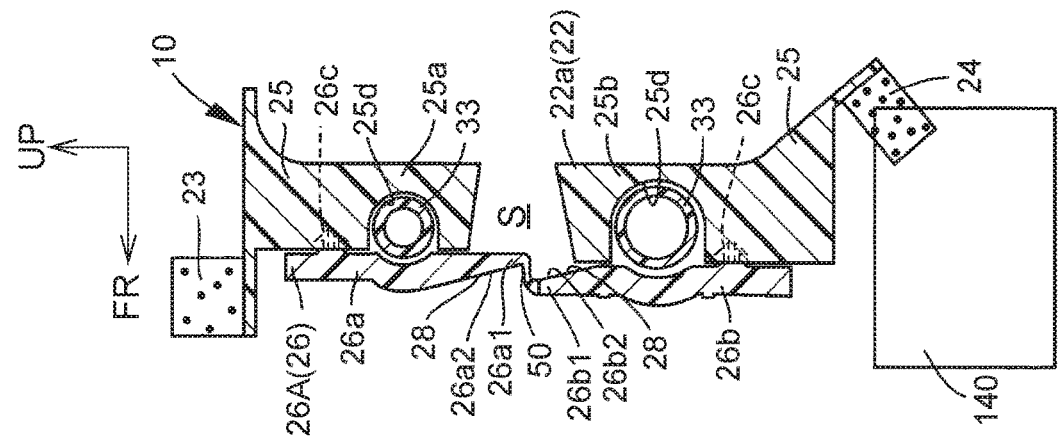
FIG. 3C is an enlarged sectional view taken along line III-III of FIG. 1, showing a state where an impact load has been applied to the grille shutter and a lower cover part has moved ahead in the vehicle front-rear direction.

As shown in FIG. 3A to FIG. 3C, the vertical frame bars 22 including the right frame bar 22a, the left frame bar 22b, and the central frame bar 22c each include a frame bar main body 25 that has recesses 25d each opening ahead in the vehicle front-rear direction and a frame bar cover 26 that is provided separately from the frame bar main body 25 and mounted to the frame bar main body 25 ahead in the vehicle front-rear direction.

Figure 4:
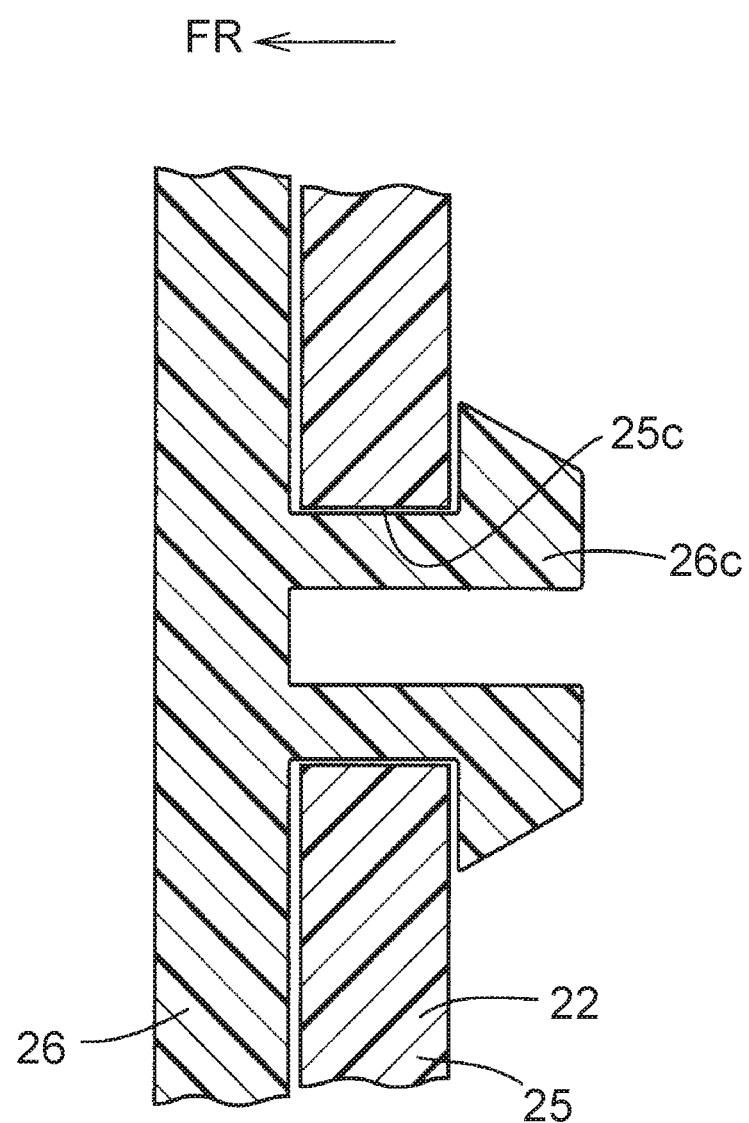
FIG. 4 is an enlarged sectional view showing a clip portion by which a frame bar cover is mounted to a frame bar main body in the grille shutter of the embodiment of the present disclosure.

As shown in FIG. 4, the frame bar cover 26 is mounted to the frame bar main body 25, for example, as clip portions 26c provided on the frame bar cover 26 are each inserted into a clip receiving portion 25c provided in the frame bar main body 25 and engaged with a peripheral edge of the clip receiving portion 25c. The clip portions 26c are provided integrally with the frame bar cover 26 so as to protrude rearward in the vehicle front-rear direction from the frame bar cover 26, and are elastically deformable in a direction orthogonal to a direction of protrusion.

Referring to FIG. 1, the fin 30 is made of resin, for example. The fin 30 has a plate shape and is disposed inside the frame 20. The fin 30 includes shafts 33 at both ends in the vehicle width direction, and with the shafts 33 turnably supported on the vertical frame bars 22, can turn relative to the vertical frame bars 22 around a turning axis extending in the vehicle width direction. Specifically, as shown in FIG. 3A to FIG. 3C, the fin 30 is turnably supported on the vertical frame bars 22 as the frame bar covers 26 are mounted to the frame bar main bodies 25 with the shafts 33 inserted in the recesses 25d provided in the frame bar main bodies 25.

As shown in FIG. 1, the fin 30 includes an upper fin 31 composed of an upper right fin 31a and an upper left fin 31b, and a lower fin 32 composed of a lower right fin 32a and a lower left fin 32b. Either only one or more than one of each of the upper right fin 31a, the upper left fin 31b, the lower right fin 32a, and the lower left fin 32b may be provided.

The upper right fin 31a is located between the right frame bar 22a and the central frame bar 22c in the vehicle width direction, above the vertical center of the frame 20 in the vehicle height direction. The upper left fin 31b is located between the left frame bar 22b and the central frame bar 22c in the vehicle width direction, above the vertical center of the frame 20 in the vehicle height direction. The lower right fin 32a is located between the right frame bar 22a and the central frame bar 22c in the vehicle width direction, below the vertical center of the frame 20 in the vehicle height direction. The lower left fin 32b is located between the left frame bar 22b and the central frame bar 22c in the vehicle width direction, below the vertical center of the frame 20 in the vehicle height direction.

The upper right fin 31a, the upper left fin 31b, the lower right fin 32a, and the lower left fin 32b can turn relative to the frame 20 by being powered by an actuator (not shown) that is provided, for example, rearward in the vehicle front-rear direction of the right frame bar 22a of the frame 20. These fins are configured to move in synchronization with one another through a link (not shown) that is provided, for example, rearward in the vehicle front-rear direction of the central frame bar 22c of the frame 20. When all the upper right fin 31a, the upper left fin 31b, the lower right fin 32a, and the lower left fin 32b are turned to a substantially horizontal position, the grille shutter 10 opens, allowing air to flow through the grille shutter 10 toward the radiator 110. On the other hand, when all the upper right fin 31a, the upper left fin 31b, the lower right fin 32a, and the lower left fin 32b are turned to a substantially vertical position, the grille shutter 10 closes, blocking air from flowing through the grille shutter 10 toward the radiator 110. Reference sign 150 in the drawings denotes a harness leading to the actuator (not shown).

The brackets 40 are respectively provided on both sides (outer sides) of the frame 20 in the vehicle width direction. For example, the brackets 40 are made of resin. The brackets 40 may be provided separately from the frame 20 and mounted by being fixed to the frame 20. To reduce the number of parts, however, it is desirable that the brackets 40 be provided integrally with the frame 20.

The brackets 40 are provided so as to extend rearward in the vehicle front-rear direction from both sides of the frame 20 in the vehicle width direction, and are joined (fastened) to the vehicle body 100 with bolts etc. (not shown).

The bracket 40 includes joint portions 43 that are joined to the vehicle body 100. The joint portions 43 are provided at a rear end 40b of the bracket 40 in the vehicle front-rear direction. The joint portions 43 include an upper joint portion 43a and a lower joint portion 43b located downward in the vehicle height direction of the upper joint portion 43a.

Here, as shown in FIG. 5, a central part 10a of the grille shutter 10 in the vehicle width direction is located rearward in the vehicle front-rear direction of the central part 141 of the second cross member 140 in the vehicle width direction, and thus does not overlap the central part 141 in the vehicle height direction. On the other hand, at least vehicle front-side end portions of both ends 10b of the grille shutter 10 in the vehicle width direction are located at the same positions in the vehicle front-rear direction as both ends 142 of the second cross member 140 in the vehicle width direction, and thus overlap these ends 142 in the vehicle height direction. Therefore, as indicated by the arrow Y in FIG. 3B and FIG. 3C, when the second cross member 140 interferes with a road surface etc. and deforms upward in the vehicle height direction in a situation such as driving on a rough road, a load from the second cross member 140 (an impact load from under the vehicle) may be applied to both ends 10b of the grille shutter 10 in the vehicle width direction. To address this risk, the grille shutter 10 further has the following configuration.

As shown in FIG. 1, a fragile portion 50 is provided at a portion of each of the right frame bar 22a and the left frame bar 22b that are vertical frame bars 22 located at both ends 10b of the grille shutter 10 or in the vicinity thereof. Specifically, the fragile portion 50 is provided in each of first frame bar covers (also referred to as upper cover parts) 26A of the frame bar covers 26 that are provided on the right frame bar 22a and the left frame bar 22b. The fragile portion 50 is provided at a middle portion of the first frame bar cover 26A in the vehicle height direction. The fragile portion 50 is not provided in a second frame bar cover (also referred to as a lower cover part) 26B of the frame bar covers 26 that is provided on the central frame bar 22c. However, the fragile portion 50 may be provided also in the second frame bar cover 26B as in the first frame bar covers 26A.

As shown in FIG. 3A, the first frame bar cover 26A includes an upper cover part 26a that extends from the fragile portion 50 upward in the vehicle height direction and covers the shaft 33 of the upper fin 31, and a lower cover part 26b that extends from the fragile portion 50 downward in the vehicle height direction and covers the shaft 33 of the lower fin 32. The upper cover part 26a and the lower cover part 26b are connected to each other by the fragile portion 50.

The first frame bar cover 26A includes both the upper cover part 26a and the lower cover part 26b mounted on the frame bar main body 25. This means that the clip portion 26c is provided on each of the upper cover part 26a and the lower cover part 26b.

A lower end 26a1 of the upper cover part 26a and an upper end 26b1 of the lower cover part 26b are located at different positions in the vehicle front-rear direction, with the upper end 26b1 of the lower cover part 26b being located ahead in the vehicle front-rear direction of the lower end 26a1 of the upper cover part 26a. Thus, the fragile portion 50 is provided so as to extend in the vehicle front-rear direction as seen from the vehicle width direction.

The fragile portion 50 connects the lower end 26a1 of the upper cover part 26a and the upper end 26b1 of the lower cover part 26b to each other. The thickness of the fragile portion 50 is set to be smaller than that of each of the upper cover part 26a and the lower cover part 26b. The fragile portion 50 is a portion at which the first frame bar cover 26A is most thinned (weakened), and is configured to undergo plastic deformation (including damage) and thereby absorb the impact when an impact load is applied to the first frame bar cover 26A.

How much stress is exerted on each part of the first frame bar cover 26A when an impact load from under the vehicle is applied to the grille shutter 10 is expressed as follows: fragile portion 50>upper cover part 26a and lower cover part 26b>clip portion 26c. Thus, as shown in FIG. 3B, when a load from the second cross member 140 (an impact load from under the vehicle) is applied to the grille shutter 10, a higher stress is exerted on the fragile portion 50 than on the upper cover part 26a, the lower cover part 26b, and the clip portion 26c. As a result, the fragile portion 50 undergoes plastic deformation while the clip portions 26c remain engaged with the frame bar main body 25.

When a load from the second cross member 140 is further applied to the grille shutter 10 after the fragile portion 50 has undergone plastic deformation, as shown in FIG. 3C, the lower cover part 26b rises ahead in the vehicle front-rear direction of the upper cover part 26a, and the lower cover part 26b exerts a force to press the upper cover part 26a against the frame bar main body 25. To allow this force to be smoothly and reliably exerted, it is desirable that an inclined surface 28 inclined upward of in the vehicle height direction and ahead of in the vehicle front-rear direction be provided at least either in a front surface 26a2 in the vehicle front-rear direction of at least the lower end 26a1 of the upper cover part 26a or in a rear surface 26b2 in the vehicle front-rear direction of at least the upper end 26b1 of the lower cover part 26b. The example shown in the drawings represents a case where the inclined surface 28 is provided in each of the front surface 26a2 of the upper cover part 26a and the rear surface 26b2 of the lower cover part 26b.

When it is feared that the frame bar main body 25 may hinder the lower cover part 26b from moving upward in the vehicle height direction, a clearance S may be provided between an upper frame bar main body 25a to which the upper cover part 26a is mounted and a lower frame bar main body 25b to which the lower cover part 26b is mounted.

Next, effects of the embodiment of the present disclosure will be described.

(i) Since the fragile portion 50 is provided at a portion of the vertical frame bar 22, when an impact load from under the vehicle is applied to the grille shutter 10 in a situation such as driving on a rough road, the impact can be at least partially absorbed as the fragile portion 50 undergoes plastic deformation (including damage). Thus, the impact exerted on the portion of the vertical frame bar 22 other than the fragile portion 50 is mitigated, and damage to the other portion of the vertical frame bar 22 can be reduced. Therefore, supporting the fin 30 on the portion of the vertical frame bar 22 other than the fragile portion 50 can restrain the fin 30 from coming off the frame 20.

(ii) The fin 30 can be restrained from coming off the frame 20 by a compact structure, because simply providing the fragile portion 50 at a portion of the vertical frame bar 22 can achieve that.

(iii) Since the vertical frame bar 22 includes the frame bar main body 25 and the frame bar cover 26 and the fragile portion 50 is provided in the frame bar cover 26, only the frame bar cover 26 has to be replaced when the impact load applied from under the vehicle to the grille shutter 10 is small and only the frame bar cover 26 has undergone plastic deformation without the frame bar main body 25 undergoing plastic deformation. Thus, the number of parts needing to be replaced can be reduced.

(iv) Since the frame bar cover 26 (first frame bar cover 26A) includes the upper cover part 26a that covers the shaft 33 of the upper fin 31 and the lower cover part 26b that covers the shaft 33 of the lower fin 32, and the upper cover part 26a and the lower cover part 26b are connected to each other by the fragile portion 50, both the upper fin 31 and the lower fin 32 can be covered by a single frame bar cover 26, which is advantageous in reducing the number of parts.

(v) Since the frame bar cover 26 (first frame bar cover 26A) includes both the upper cover part 26a and the lower cover part 26b mounted on the frame bar main body 25, both the upper cover part 26a and the lower cover part 26b can be maintained in a state of being mounted on the frame bar main body 25 even when the fragile portion 50 has undergone plastic deformation. Thus, it is possible to restrain the frame bar cover 26 (first frame bar cover 26A) from coming off the frame bar main body 25, and the fin 30 from coming off the frame 20, even when the fragile portion 50 has undergone plastic deformation.

(vi) Since the fragile portion 50 is a portion having a smaller thickness than the upper cover part 26a and the lower cover part 26b, the fragile portion 50 can be provided by a simple configuration.

(vii) Since the lower end 26a1 of the upper cover part 26a and the upper end 26b1 of the lower cover part 26b are located at different positions in the vehicle front-rear direction, the upper cover part 26a and the lower cover part 26b can be restrained from butting against each other in the vehicle height direction, and thereby hindering the plastic deformation of the fragile portion 50, when an impact load from under the vehicle is applied to the grille shutter 10 and the fragile portion 50 undergoes plastic deformation.

(viii) Since the upper end 26b1 of the lower cover part 26b is located ahead in the vehicle front-rear direction of the lower end 26a1 of the upper cover part 26a, the lower cover part 26b rises upward in the vehicle height direction of the upper cover part 26a when the fragile portion 50 undergoes plastic deformation and the lower cover part 26b moves upward in the vehicle height direction. Thus, the upper cover part 26a can be kept from moving ahead in the vehicle front-rear direction by the lower cover part 26b. It is therefore possible to effectively restrain the upper cover part 26a from coming off the frame bar main body 25 and the upper fin 31 from coming off the frame 20.

(ix) Since the fragile portion 50 is provided so as to extend in the vehicle front-rear direction, the upper cover part 26*a* and the lower cover part 26*b* can be connected to each other by the fragile portion 50 even when the lower end 26*al* of the upper cover part 26*a* and the upper end 26*b*1 of the lower cover part 26*b* are located at different positions in the vehicle front-rear direction.

(x) As seen from the vehicle width direction, the upper cover part 26*a* and the lower cover part 26*b* extend in the vehicle height direction, and the upper cover part 26*a*, the lower cover part 26*b*, and the fragile portion 50 form a step shape as a whole. This allows a relatively high stress to be exerted on the fragile portion 50 when an impact load from under the vehicle is applied to the grille shutter 10. Thus, the fragile portion 50 can efficiently undergo plastic deformation.

(xi) The frame bar cover 26 is mounted to the frame bar main body 25 as the elastically deformable clip portions 26*c* integrally provided on the frame bar cover 26 are inserted into the clip receiving portions 25*c* provided in the frame bar main body 25. Thus, the number of parts can be reduced compared with when the frame bar cover 26 is mounted to the frame bar main body 25 by another part, such as a bolt. Moreover, the frame bar cover 26 can be easily mounted to the frame bar main body 25.

What is claimed is:

1. A grille shutter comprising:
   a frame including a vertical frame bar extending in a vehicle height direction, a fragile portion being provided at a portion of the vertical frame bar, the vertical frame bar includes a frame bar main body that includes a recess and a frame bar cover that is provided separately from the frame bar main body and mounted to the frame bar main body, the fragile portion is provided in the frame bar cover; and
   a fin movably supported on the vertical frame bar, the fin includes a shaft, at least one upper fin and at least one lower fin, the fin is movably supported on the vertical frame bar as the frame bar cover is mounted to the frame bar main body with the shaft inserted in the recess of the frame bar main body,
   wherein the frame bar cover includes an upper cover part that extends upward in a vehicle height direction from the fragile portion and covers a shaft of the upper fin, and a lower cover part that extends downward in a vehicle height direction from the fragile portion and covers a shaft of the lower fin, and the upper cover part and the lower cover part are connected to each other by the fragile portion.

2. The grille shutter according to claim 1, wherein the fragile portion is provided integrally with the upper cover part.

3. The grille shutter according to claim 1, wherein the fragile portion is provided integrally with the lower cover part.

4. The grille shutter according to claim 1, wherein the frame bar cover includes both the upper cover part and the lower cover part mounted on the frame bar main body.

5. The grille shutter according to claim 1, wherein a thickness of the fragile portion is smaller than a thickness of the upper cover part and the thickness of the fragile portion is smaller than a thickness of the lower cover part.

6. The grille shutter according to claim 1, wherein a lower end of the upper cover part and an upper end of the lower cover part are located at different positions in a vehicle front-rear direction.

7. The grille shutter according to claim 1, wherein:
   the frame bar cover is mounted to the frame bar main body ahead of the frame bar main body in a vehicle front-rear direction; and
   an upper end of the lower cover part is located ahead of a lower end of the upper cover part in the vehicle front-rear direction.

8. The grille shutter according to claim 1, wherein the fragile portion is provided so as to extend in a vehicle front-rear direction.

\* \* \* \* \*